No. 730,833. PATENTED JUNE 9, 1903.
J. R. LORD.
GALVANIC BATTERY.
APPLICATION FILED FEB. 20, 1903.
NO MODEL.

Witnesses:
John Ross
M. J. Rums

Inventor:
J. Roger Lord.

No. 730,833. Patented June 9, 1903.

UNITED STATES PATENT OFFICE.

JOHN ROGER LORD, OF TOTTENVILLE, NEW YORK.

GALVANIC BATTERY.

SPECIFICATION forming part of Letters Patent No. 730,833, dated June 9, 1903.

Application filed February 20, 1903. Serial No. 144,348. (No model.)

*To all whom it may concern:*

Be it known that I, JOHN ROGER LORD, a citizen of the United States, residing at Tottenville, Staten Island, State of New York, have discovered a new and useful art or process for the recharging or rehabilitation of any exhausted galvanic element by the use of heat, of which the following is a specification.

My invention or discovery relates to electrochemistry, and is applicable in the broadest and most general sense.

Briefly stated, the process consists of the evaporation of the exhausted electrolyte of a galvanic element into a condenser, the apparatus being closed, so that none of the factors composing the electrolyte escape. When the evaporation is completed, the condenser contains the water and acid employed, and there remains behind in the cell the positive-pole and negative-pole electrodes plus the oxid of one or both of them, according to what combination is employed. The electrodes so left are then in a state or condition ready for the addition of an electrolyte to render them active, and all the metal that was originally in the cell is then still in it and in an active shape. The condenser contains acid and water, varying with the electrolyte employed, and when this is permitted to again enter into the cell the generation of electricity is resumed.

Figure 1:
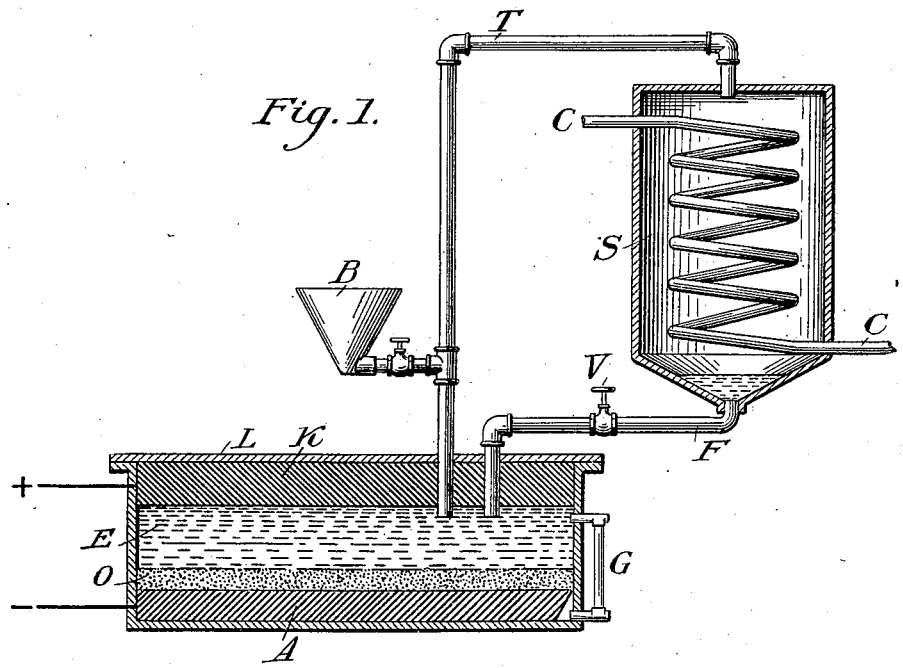
Figure 2:
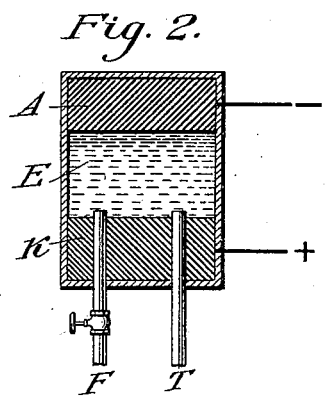
Figure 4:
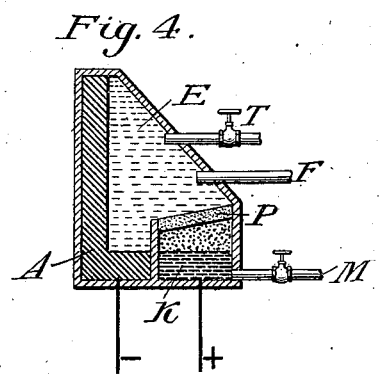
Figure 3:
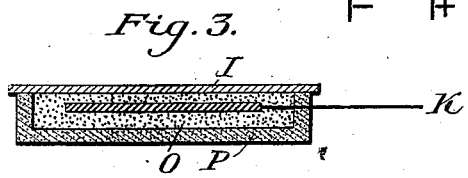

Figure 1 represents a simple galvanic cell to which heat may be applied and which is connected to a condenser temporarily. Figs. 2 and 4 are simple forms of cell, illustrative of the application of the process. Fig. 3 is a diagram of one form of cathode applicable to a galvanic element when intended to be treated by the described process and is also merely illustrative.

The process is susceptive of a wide range of application, and its purpose is the indefinitely-repeated generation of electricity from the same element, which is as repeatedly rehabilitated by the application of heat. An exhausted electrolyte usually consists of a salt of the metal of the anode, and the heat of evaporation needs to be sufficient to effect its decomposition into a volatile portion consisting of dilute acid, base, or water, as the case may be, and a residue consisting of an oxid of the anode or a practical equivalent thereto. If the electrolyte is evaporated into the atmosphere, the quantity of acid and water which thus escapes has merely to be resupplied in the cell.

A convenient form of condenser is illustrated in Fig. 1, where S represents a section of the containing-shell; C C, a circulating-coil; T, the entrance for vapors and gases, and F the passage by which the condensed liquefied factors are readmitted to the cell, by means of valve V, when desired.

Any galvanic element (consisting of negative and positive electrodes and an electrolyte) may be employed either primarily or secondary, those terms having little significance, and any sort of a fire may be employed for the evaporation.

In Fig. 1 K represents the cathode or positive-pole electrode; A, the anode or negative-pole electrode; O, an oxid of the anode; E, an electrolyte; + and —, the respective exterior poles, and G a gage-glass for conveniently observing the position of the electrolyte.

The first principle of the process is based upon the but slightly-appreciated fact that an oxid of the metal forming the anode or negative-pole electrode of an active galvanic cell will be acted upon by the electrolyte and generate a current in the same manner that the metal will. If, for example, zinc oxid be placed on a zinc anode, the electrolyte will attack the oxid with greater avidity than the zinc and readily generate a current. In truth, a current may be had with an anode composed wholly of zinc oxid with merely a thin strip of copper or any other metal placed into or under it to serve as a connection. This is best illustrated in a dry pile with the electrolyte contained in a well-saturated strip of convenient absorbent. If an element is arranged with zinc at the top surface of the electrolyte and dry oxid be dropped on the liquid, the oxid will float, and it will be observed that as oxid decomposes all its particles are physically drawn or attracted strongly to the zinc anode of the cell. This is probably an explanation of why the oxid gives the best results when operating in conjunction with an anode of the same metal, and, further, indicates that an actual physical contact of oxid with anode is not imperative initially, since the decomposition effects it, or, at any rate, effects it in so far as the oxid's negative ions are concerned. The oxid of any other metal used as an anode or negative electrode behaves similarly. The oxid thus employed at the anode has a depolarizing effect at the cathode or positive-pole electrode similar to that which is afforded by an oxidizing agent at the cathode itself. This feature, I am aware, is not new; but while an oxid is being used at the anode as a "depolarizer" the fact seems to have been overlooked that the metal of the oxid combines with the electrolyte necessarily as fast as released from its oxygen, and thus performs the anode's function in the generation of the electricity, to the exclusion of the metal of the anode itself, provided the quantity of oxid is not exhausted before the electrolyte becomes saturated.

In the galvanic element—for example, $Zn,ZnO(H_2SO_4+10H_2O)Cu$—the acid attacking the ZnO reacts into $ZnSO_4+H_2O$, and no hydrogen is liberated at the Cu cathode. Whether the metallic ion $H_2$ is forced to come into contact with the copper cathode and discharge its electricity before it can associate with the released O from ZnO to form water is a subject for discussion. When this element is exhausted, it consists of $$Zn(ZnSO_4+11H_2O)Cu,$$

and since there is no copper in the solution the evaporation by heat will drive $H_2O$ into the condenser, followed by decomposed $SO_2+O$, leaving zinc oxid precipitated on the zinc anode, which latter is arranged to receive the oxid by the force of gravity.

Another familiar form of galvanic element delivering a gaseous ion is $Zn(NH_4Cl+H_2O)C$. Since the first evaporation will leave zinc oxid deposited on the zinc anode and a superfluous $H_2$ occluded in the carbon, let us represent the element as $$Zn,2ZnO(2NH_4Cl+H_2O)C.$$

As a current is generated, Zn (from ZnO) replaced $NH_4$, making $ZnCl_2$. The O from ZnO joins $H_2$, (from the $2NH_4$,) making a molecule of water and leaving $2NH_3$ to form $2NH_4OH$. Zn then replaces $NH_4$, forming $Zn(OH)_2$ and driving $NH_4$ to carbon, where probably $NH_3$ is wholly occluded and the remaining $H_2$ less so. It is possible that Zn combines with $NH_4OH$ to form ammonium zincate, $(NH_4)_2ZnO_2$, and releasing $H_2$ only to the carbon electrode. The ultimate result is the same in either case. Assuming the first equation the exhausted element then consists of $$Zn,ZnCl_2+Zn(OH)_2,C(2NH_3+H_2)_{\text{occluded.}}$$

and when evaporated 2ZnO is found precipitated on the zinc anode and the balance of the electrolyte in the condenser. This may be assumed as the practical result. It is true that the evaporation also precipitates some basic chlorid ZnOHCl, which, however, is equivalent to ZnO+HCl, and, in any case, the passages from cell to condenser are not wholly cleared of gases, else a vacuum would result. If any $NH_3$ remains occluded in the cathode, it is immediately withdrawn on the reëntrance of water into the cell. That zinc reacts chemically and electrically with ammonium hydrate is evidenced by the fact that an electric current is had from zinc, zinc oxid, carbon, and commercial aqua ammonia arranged as a galvanic element.

In the case of elements of the Daniell class, where the metallic ion of one salt replaces the metallic ion of another, the exhausted electrolyte may be represented (with its electrodes) by $Zn(ZnSO_4+H_2O)Cu$, all of the copper previously in the active solution having been deposited on the cathode. If the element be arranged in a cell or vessel, as illustrated in Fig. 2, where A represents anode, K cathode, and E the electrolyte, E would then consist of $ZnSO_4+H_2O$. When the electrolyte is exhausted, let the vessel containing it, Fig. 2, be inverted, so that A is at the bottom and K at the top. When evaporation is had in that position, zinc oxid is precipitated upon the zinc anode or negative-pole electrode and the volatile portion of the electrolyte, consisting of $H_2SO_4$ plus water, passes into the condenser. Hence when recombined this element is equivalent to the one first mentioned, viz:

$$Zn,ZnO(H_2SO_4+H_2O)Cu.$$

In those galvanic elements employing alkaline hydrates or hydroxids as an electrolyte, the zinc, iron, cadmium, or other metal utilized as a negative-pole electrode attacks the hydrate by replacing the hydrogen. Thus $Zn,ZnO(2KOH+H_2O)X$ cathode equals, when exhausted, $$Zn(K_2ZnO_2+2H_2O)X,$$

X being any appropriate positive-pole electrode, with or without a "depolarizing agent" surrounding it or being a part of it.

When the exhausted solution is evaporated, the $K_2ZnO_2$ (which is a feeble acid salt wherein $ZnO_2$ is acting as a negative radical) is decomposed and precipitated, as $K_2O$ and ZnO. There then remains nothing other than water to be evaporated into the condenser, so that in this case it would be more sensible to evaporate into the atmosphere and resupply water to the cell from a fresh source. The valve opening into B may be utilized for this purpose, as shown in Fig. 1, or the lid L raised or the condenser be removed entirely. As water is readmitted into this cell (after cooling) $K_2O$ attacks it with avidity, forming $K_2H_2O_2$, (or 2KOH,) which returns us, as will be observed, to the original active equation. The chemistry of the lead, lead-peroxid element from the insurmountable difficulties in the way of analysis does not apear to be definitely agreed upon. Wade's hypothesis of polymerization on the part of lead is probably nearest the truth. While investigating this element, lead, sulfuric acid, lead-peroxid I have found that a fair imitation of a charged negative-pole electrode may be had by pouring molten lead into water, (or otherwise finely dividing the lead,) mixing it with moistened litharge, pressing the whole into the bottom of a cell or small vessel over and covering a strip of lead, (or wire of any metal,) leading to exterior for electrical connection and heating the whole until there is partial fusion of the lead.

An imitation of a charged positive electrode may be had by covering any positive metallic connection (as lead, copper, carbon, silver, platinum, &c.) with the usual minium paste, $Pb_3O_4+H_2SO_4$. The conducting metal employed should have a reasonably large surface in contact with the paste and the paste itself be surrounded by some porous envelop (as a porous pot) to hold it in position. The whole is then subjected to strong heat. $H_2SO_4$ decomposes red lead probably into an indefinite polymeric plumbic sulfate specially rich in oxygen and somewhat hydrated. At any rate, when it is strongly heated water is first given off, followed by strong fumes of $SO_2$. The latter continues to be expelled for some time, and the paste hardens into a brittle, highly porous, light plum-colored mass closely resembling a positive-pole plate of a lead "storage battery" charged and dried. As indicated by the copious expulsion of $SO_2$, the composition of the mass remaining is no doubt chiefly $PbO_2$, with enough $PbSO_4$ combined molecularly or otherwise to give it form. Having been a paste made of $H_2SO_4$, it is not soluble in that acid, but absorbs it sponge fashion. Reapplication of heat again drives the acid out as $H_2O, SO_2, O$ without its apparently having made any impression on the porous mass, which we call $PbO_2$, if the paste in the beginning has been heated until thoroughly desulfated. It is noticeable that if the paste is first left with considerable sulfation the subsequent immersion in acid tends to soften it into the original paste, especially near the surface. It hardens again, however, into its porous plum-colored form upon the reapplication of heat. Electrodes thus prepared, being substantially those of the charged lead, lead-peroxid storage battery, generate a current of electricity when immersed in a sulfuric-acid electrolyte and when exhausted are rehabilitated by evaporation at a heat sufficient to decompose the salts in the same manner as any other galvanic element.

Good results are had from the zinc, lead-peroxid combination. It is found (as before stated) that zinc oxid at a zinc anode—that is, the electrode from which the metallic ion proceeds through the solution when a galvanic element is in an active state—operates after the manner of a depolarizer, absorbing or combining with the hydrogen, which would otherwise appear in bubbles at the cathode; but it is also observed that if there is an additional oxidizing agent at the cathode the strength of the current is improved. Since by the use of an oxid at anode there is sufficient oxygen to combine with all liberated hydrogen ions without drawing on any cathode supply, the action of the latter seems to be something of a catalytic one. In the case of a lead peroxid the only observable action is that it becomes somewhat sulfated by the absorption of sulfuric acid, which, as before stated, is driven out again by heat. Similar action is observed in the case of copper oxid in an alkaline hydrate. On this account (insolubility) either of these is admirably adapted. Fig. 3 illustrates one form of such a cathode, K being the exterior metallic connection joined to the edge of a metal disk, the section of which is represented as extending into the oxid (or equivalent) O, placed or packed around it, the whole being contained in a shallow porous dish P, having an impervious cover I. Any number of these may be placed in the same vessel, alternating with appropriate negatives.

In the case of a positive-pole electrode of mercury as employed in some galvanic elements the containing vessel may be so arranged as to draw the mercury off before evaporation begins and to readily replace it subsequently. Fig. 4 illustrates a convenient form. A, anode; E, electrolyte; K, cathode, (mercury;) O, depolarizing-oxid; P, porous partition; M, valve for drawing off and replacing mercury; T, opening to condenser; F, return-passage from condenser. When ready to evaporate, the vessel is turned over to the left, so that anode A is on the bottom to receive the precipitated oxid from the electrolyte.

Any unused or unconsumed cathode oxid which may be employed as a depolarizing agent is not decomposed or otherwise affected deleteriously by the heat required for the evaporation of the exhausted electrolyte and the attendant decomposition into constituents.

In the practical application of this process it should be remembered that the factors composing a galvanic element are to be arranged with a view to their rehabilitation. As a galvanic element is now usually set up, the anode is as a rule suspended in the electrolyte and is so eaten away when the element is exhausted that the electrical connection is practically destroyed. The anode should be of such liberal proportions that much of it remains when the electrolyte is saturated with its salt. I find it most satisfactory to prepare the anode in the first instance substantially as follows: Place the anode metal in the bottom of a porcelain-lined vessel capable of withstanding heat and have the electrical connection leading to exterior such that it will not be broken in case the anode should happen to fuse. Then prepare a thick paste of the anode's oxid mixed with the acid of the electrolyte to be employed and cover the anode metal with it to the depth of half an inch or more. In any case the quantity of paste should be sufficient to more than saturate the quantity of electrolyte employed when the element is finally set up. This paste may be optionally made of that salt of the anode corresponding to the acid of the electrolyte, water being used instead of the acid for mixing it, if not insoluble in water. When the paste is thus in position, apply strong heat sufficient to thoroughly evaporate the acid and to expel the acid radical from the salt, leaving an oxid (or equivalent) of the anode metal. This hardens into a porous and rigid mass, surrounding and incasing the anode metal, and is subsequently vigorously attacked by the electrolyte. I call this porous mass an "oxid" of the anode for the same reason that the positive plate of a charged storage battery is called "peroxid of lead." Its color and structure varies with the acid and metal employed, and its precise composition is difficult to determine. From the practical manner in which the electrolyte attacks it, however, it may be safely termed an "oxid of the anode metal." The final result reached is the same as that accomplished by each subsequent rehabilitation, and for that reason is desirable in the beginning.

While a "cathode-depolarizer" does not necessarily constitute an indispensable part of a galvanic element, the use of one, as before noted, is desirable. If one is used in connection with the process described, it should either be insoluble in the electrolyte employed or else be of such volatile character that the whole of it will pass into the condenser on evaporation of the electrolyte, or if a partially-volatile catalytic depolarizer is employed its non-volatile factor should be anhydrous and the whole of it of such character that it may be mixed directly with the active electrolyte without the intervention of a porous pot.

The cathode may be removed from the cell before evaporation of the electrolyte begins, if desired, it being replaced and dried out with the anode after the electrolyte has passed into the condenser. This precaution is perhaps desirable with some combinations.

These details are merely intended to indicate the scope and application of the process.

I do not, of course, confine myself to the form of apparatus shown in the drawings. The process as described may be practically performed and applied with any suitable apparatus, the possible variation in the arrangement of which is obvious.

Having described the process for rehabilitating an exhausted galvanic element by the use of heat, what I claim is—

1. A process of rehabilitating exhausted electrical batteries, which consists in arranging the electrodes thereof so that any solids formed during evaporation will be deposited by gravity upon or in proximity to the anode, but will be prevented from lodging upon the active surface of the cathode; then heating the battery at a temperature and for a time sufficient to evaporate the contained electrolyte, thereby causing the deposition of the non-volatile constituent thereof in a chemically and electrically active form upon the anode, substantially as described.

2. A process of rehabilitating exhausted batteries which consists in heating the exhausted or partially-exhausted electrolyte at a temperature and for a time sufficient to evaporate the electrolyte and to convert the compounds or salts contained therein to a form chemically and electrically active, substantially as described.

3. A process of rehabilitating exhausted batteries, which consists in heating the electrodes thereof with their accompanying electrode compounds or salts formed during the use of the battery, at a temperature and for a time sufficient to evaporate any contained or combined electrolyte and sufficient to restore the said compounds or salts to a chemically and electrically active state, substantially as described.

4. A process of rehabilitating exhausted batteries, which consists in heating the exhausted or partially-exhausted electrolyte at a temperature and for a time sufficient to evaporate the electrolyte and to convert the non-volatile portion into an electrically-active form, and condensing and collecting the volatile portion, thus recovering both portions of the electrolyte, substantially as described.

5. A step in the process of rehabilitating exhausted batteries, which consists in heating the exhausted electrolyte to a temperature sufficient to cause evaporation, and condensing and collecting the volatile constituent of such electrolyte, substantially as described.

6. An anode for batteries, formed by placing a conductor in an exhausted electrolyte in such position that the solids formed during evaporation will be deposited thereon, and evaporating the electrolyte thereby causing the deposition of the non-volatile residuum upon the conductor to form the active material of the anode, substantially as described.

In testimony whereof I have signed my name to this specification in the presence of two subscribing witnesses.

J. ROGER LORD.

Witnesses:
EVERETT KNOWLTON,
HALVOR C. BARMEN.